May 2, 1950 J. F. MELICHAR 2,506,098
VALVE INDEXING MEANS FOR FUEL SYSTEMS
Filed May 17, 1944 2 Sheets-Sheet 2
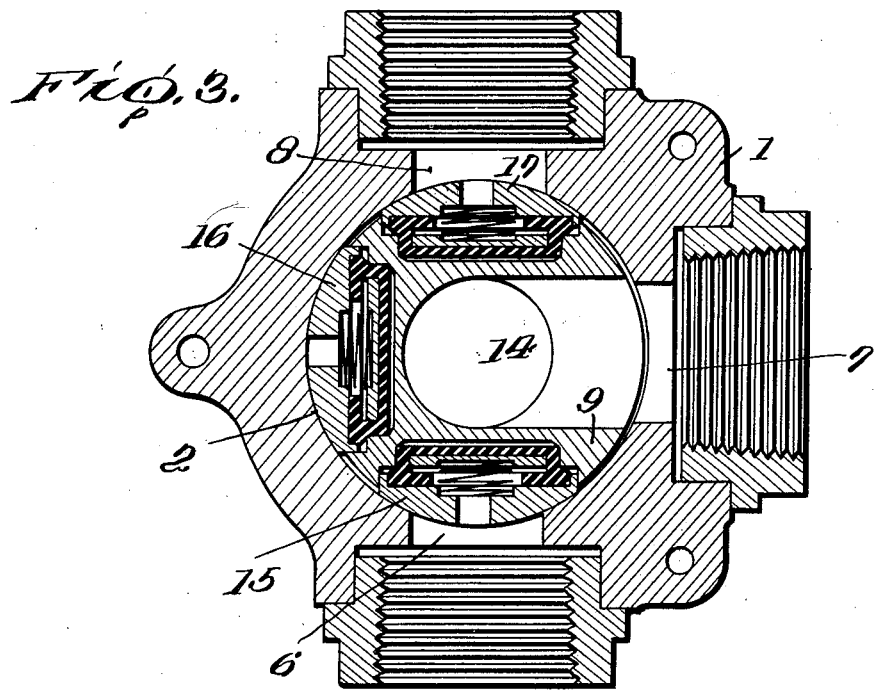
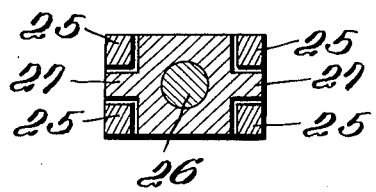
Inventor
Joseph F. Melichar
By Mason, Porter & Diller
Attorneys Patented May 2, 1950

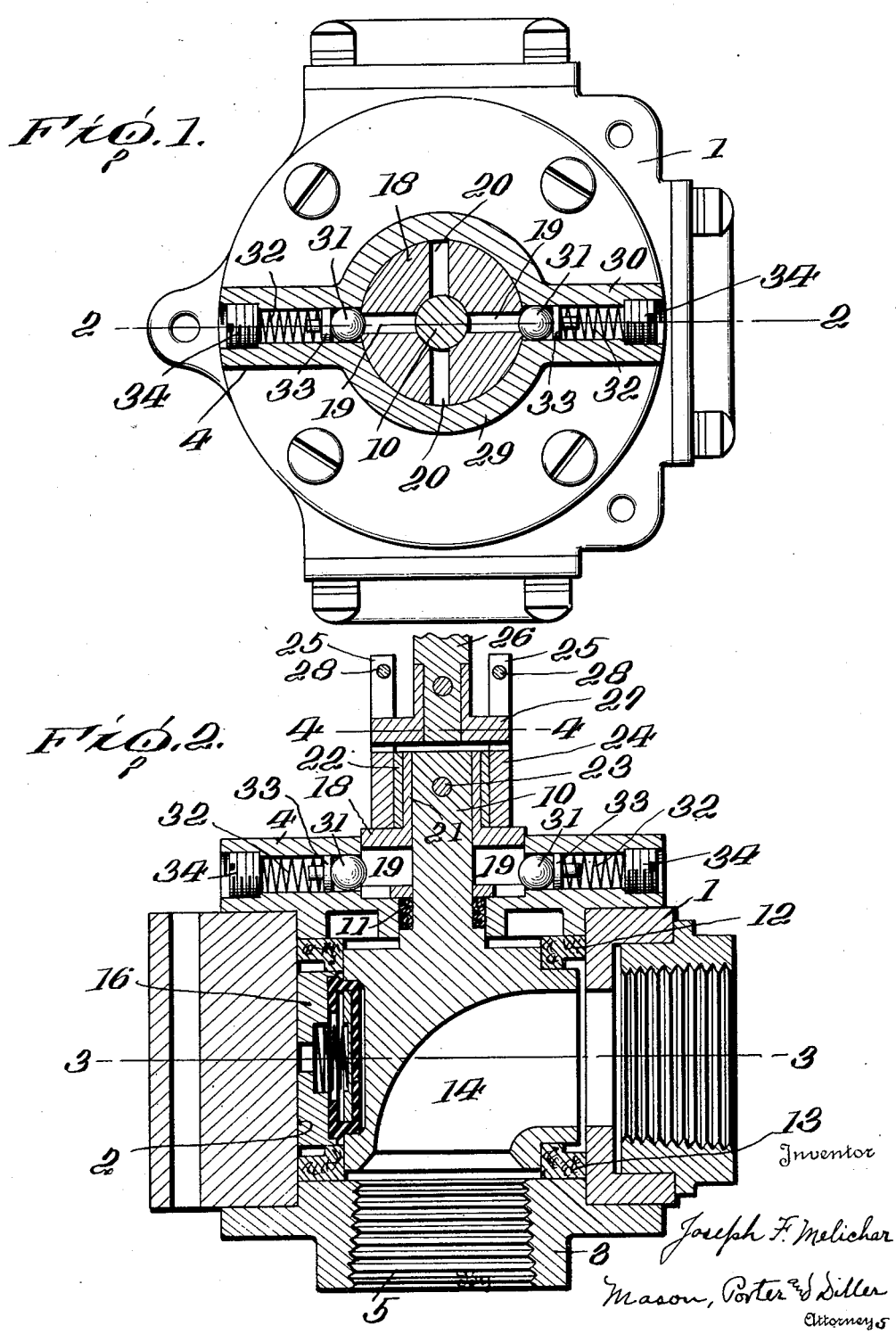

2,506,098

UNITED STATES PATENT OFFICE 2,506,098

VALVE INDEXING MEANS FOR FUEL SYSTEMS

Joseph F. Melichar, Cleveland, Ohio, assignor to The Parker Appliance Company, Cleveland, Ohio, a corporation of Ohio Application May 17, 1944, Serial No. 536,035

1 Claim. (Cl. 251—103)

The invention relates to new and useful improvements in a valve indexing means for selectively dispensing fuel which valve is especially adapted for use in aircraft construction.

An object of the invention is to provide an indexing mechanism which is disposed outside of the valve chamber and which operates through the valve stem for selectively positioning the valve rotor, which indexing means is so constructed as to bear with equal pressure on opposite sides of the stem so that the stem is maintained centered in the bearings therefor.

A further object of the invention is to provide an indexing mechanism of the above type wherein an indexing head is mounted on the valve stem and secured thereto and wherein the positioning devices cooperating with the indexing head contact with the same at diametrically opposite points.

A further object of the invention is to provide an indexing mechanism of the above type wherein spring pressed balls cooperate with the indexing head.

These and other objects will in part be obvious and will in part be hereinafter more fully disclosed.

In the drawings—

Figure 1 is a view partly in plan and partly in section of a valve having the improved indexing mechanism applied thereto;

Figure 2 is a vertical section on the line 2—2 of Figure 1;

Figure 3 is a sectional view through the valve casing and showing one arrangement of ports used in connection with the improved indexing mechanism; and Figure 4 is a sectional view on the line 4—4 of Figure 1.

The improved indexing mechanism is shown as applied to a valve assembly which includes a valve casing 1 which has a cylindrical passage extending vertically therethrough forming a valve chamber 2. The lower end of the valve casing includes a bottom plate 3 and the upper end of the valve casing includes a cap plate 4. The bottom plate 3 has a port therethrough, indicated at 5 through which fluid is delivered from a selected one of a plurality of sources. As shown in Figure 3, the valve housing is provided with three inlet ports 6, 7 and 8. Suitable adaptors are associated with each port for connection to pipes leading from independent sources of fuel supply.

Mounted in the valve casing is a valve rotor 9. The valve rotor 9 is provided with a valve stem 10 by which the valve is rotated. The stem is preferably integrally attached to the rotor. This stem extends through the cap plate 4. Suitable packing rings 11 disposed between the stem and the cap 4 serve to provide a fluid tight joint between the stem and the cap. As illustrated, the valve rotor is dimensioned so that it does not contact with the wall of the cylindrical chamber 2 in which it rotates. Non-metallic wear plates 12 and 13 are provided which maintain the rotor centered in the valve chamber. The port 5 in the valve casing is connected with a port 14 in the valve rotor and this port 14 is adapted to be positioned in alignment selectively with one of the ports 6, 7 and 8. The valve rotor is provided with individual valves 15, 16 and 17. This valve rotor and the valves form no part of the present invention, but are shown, described and claimed in my copending application filed by me on April 28, 1944, Serial No. 533,182. The valve rotor is shown and described purely for the purpose of illustrating a type of rotor which may be connected selectively to a series of inlet ports. The invention has to do with an indexing mechanism for a valve rotor of the type which has been described in detail above.

Mounted on the stem 10 is an indexing head 18. This indexing head is circular in shape and is provided with four recesses 19, 19 and 20, 20. The recesses are arranged in pairs diametrically opposed to each other and, as shown, they are spaced 90° apart the same as the ports which are shown in Figure 3. This indexing head has an integral sleeve 21 and mounted on this sleeve is a block 22. The block and sleeve of the indexing head are fastened securely to the valve stem 10 by a pin 23 which passes through the stem, the sleeve and the block. Welded to opposite sides of the rectangular block 22 are plates 24, 24. These plates have upstanding spaced arms 25, 25. A means for turning the valve stem and thus positioning the valve selectively for connection with a desired port, is connected to these upstanding arms 25, 25. The means for turning the valve may be in the form of a handle positioned between these arms and projecting laterally from the valve stem. In Figure 1 of the drawings there is shown a shaft 26 which is preferably of flexible construction. This shaft carries a head 27 with laterally projecting lugs adapted to extend between the pairs of arms 25, 25. Retaining wires 28 or pins, connect the upper ends of the pairs of arms so as to prevent the head of the flexible shaft 26 from moving out of connection of the turning block secured to the stem.

The cap 4 has a raised central portion 29 with diametrically opposed ribs or raised portions 30. This raised portion has a circular chamber in which the indexing head 18 is mounted for rotation. The ribs 30 are bored through longitudinally, and in the bore of the rib is a ball 31. A spring 32 bears against the presser member 33 which in turn bears against the ball. The outer end of the spring bears against the threaded sleeve 34 which is slotted so that it can be turned in or out of the bore for varying the tension on the spring. There are oppositely opposed balls contacting with the indexing head and springs associated therewith, as shown in Figues 1 and 2. The indexing head serves as a bearing support for the indexing head, that is, it contacts with the cylindrical wall of the chamber in the cap in which it is mounted. The pressure of the springs on the balls and against this indexing head is continuous and at points directly opposed to each other so that the pressure of one is equalized by the pressure of the other. This aids in the maintaining of the stem of the rotor centered relative to the valve casing and the bearings in which the rotor is mounted. In other words, the indexing means does not in any way tend to cramp or interfere with the rotation of the valve rotor. The rotor does not contact with the valve chamber, as noted above, but the non-metallic wear plates 12 and 13 hold this rotor centered in the valve chamber.

The recesses in the indexing head are so disposed that when the port 14 is brought into register with the port 7 as illustrated in Figure 3, then the balls are directly opposite the recesses 19, 19 and will engage within the recesses yieldingly but with sufficient pressure to hold the valve in this selected aligned position. When it is desired to shift the rotor to connect the port 14 with another inlet port, the valve stem is forcibly rotated and the balls will yield to allow the valve rotor to be turned, and when the port is brought into alignment with another inlet port, the balls will engage their respective recesses and hold the valve rotor in the selected set position. The recesses 20, 20 are used for positioning the valve rotor for connection with either the port 6 or the port 8 while the pair of recesses 19 are used for centering the valve rotor for connection with the port 7.

It will be understood that the number of ports may be varied, in which case the number of recesses in the indexing head will be changed. The indexing recesses, however, should be spaced angularly the same as the ports and whenever the valve rotor is positioned for connection with the selected port, the balls will engage a pair of recesses and the lateral pressure of the balls against the indexing head and, in turn, the valve stem, will always be equalized.

It is obvious that other forms of valve rotors may be used and it is also obvious that many changes may be made in the details of construction of the indexing head and the yielding devices cooperating therewith. It is essential, however, that the yielding devices shall be disposed diametrically opposite to each other so as to equalize the lateral pressure brought to bear against the indexing head.

I claim:

An indexing mechanism for a valve comprising a casing having a valve chamber provided with a port in the wall thereof, a cap for closing the upper end of said chamber, a valve rotor disposed in said chamber for opening and closing said port, a stem connected to the valve rotor and projecting through an opening in the cap, said opening being dimensioned so as to provide a packing chamber surrounding said stem, a packing in said chamber, said opening also including an enlarged recess adjacent the packing chamber and open to the exterior of the cap, an indexing head removably attached to the valve stem and disposed within said opening so as to close both the packing chamber and the recess, said indexing head having a radial recess disposed wholly within said head and positioned to correspond with said port in the valve casing, a yieldably member housed within the cap and adapted to engage said recess for positioning the valve rotor relative to the port, said indexing head being insertable and removable from the recess from the exterior of the cap so as to permit servicing of the packing and the yieldable member.

JOSEPH F. MELICHAR.

REFERENCES CITED

The following references are of record in the file of this patent:

UNITED STATES PATENTS

| Number | Name | Date |
|---|---|---|
| 1,389,267 | Norton et al. | Aug. 30, 1921 |
| 2,233,840 | Koehler | Mar. 4, 1941 |
| 2,416,814 | Borse | Mar. 4, 1947 |